Oct. 10, 1967      J. B. STOKES      3,345,706
CLIPS FOR MOUNTING RODS AND THE LIKE ON PANELS
Filed Oct. 21, 1966
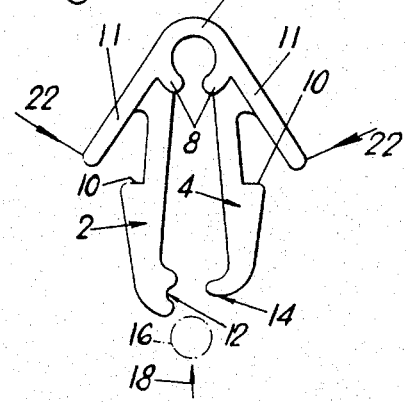
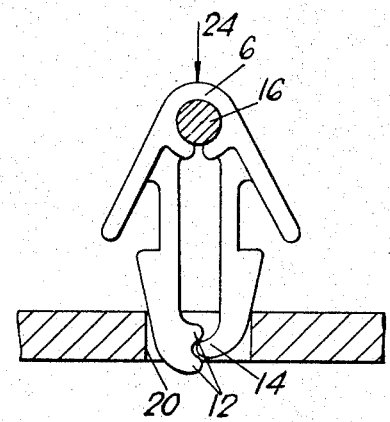
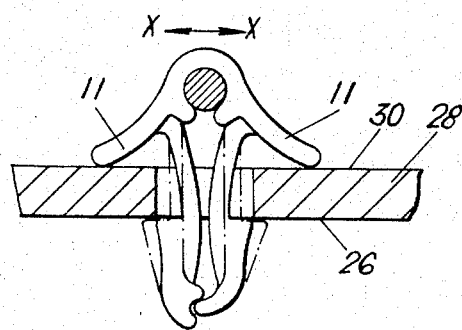
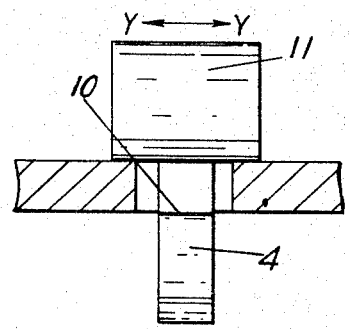
Inventor
JOHN BRYAN STOKES
By Robert W. Reust
His Attorney

United States Patent Office 3,345,706
Patented Oct. 10, 1967

3,345,706
CLIPS FOR MOUNTING RODS AND
THE LIKE ON PANELS
John B. Stokes, Will Aston, Nantwich, England, assignor
to Illinois Tool Works Inc., Chicago, Ill., a corporation
of Delaware
Filed Oct. 21, 1966, Ser. No. 588,569
Claims priority, application Great Britain, Oct. 22, 1965,
44,848/65
8 Claims. (Cl. 24—73)

This invention relates to clips and more particularly relates to one-piece thermoplastic clips for mounting rods and the like on panels.

There is a need to be able to mount rods, pipes or wires of small diameter, e.g., less than one-tenth ($\frac{1}{10}$) inch, adjacent to the face of a panel and with said devices being substantially parallel to the face of the panel.

It is an object of the present invention to provide such a clip which will solve the foregoing problem. A further object of the invention is to provide a one-piece thermoplastic clip which is capable of maintaining a rod, pipe, or wire of relatively small cross-sectional area in substantially parallel relationship to the face of an apertured panel with which it is to be associated.

A further object of the invention is to provide a clip which is capable of maintaining a workpiece such as a rod, pipe, or wire having either a circular or non-circular cross section in mounted relation to the face of an apertured panel.

Still another object of the present invention is to provide a simple, economical clip which can be easily fabricated and which provides ease of assembly to an apertured work panel.

Other and further objects of the invention will become apparent to those skilled in the art when the following specification is read in conjunction with the accompanying drawing wherein:

FIG. 1 is an end elevation of a clip embodying the teachings of this invention in its initial unstressed condition;

FIG. 2 shows the same clip in the initial stage of introduction into an apertured panel;

FIG. 3 shows the clip in the final stages of introduction into said apertured panel; and FIG. 4 is a side elevation of the clip in mounted position in an apertured panel.

Referring now to the accompanying drawing wherein similar numerals are used to identify similar parts, an embodiment of a clip according to the present invention includes two arms 2 and 4 which are joined together at one end by a resilient neck 6, and diverge slightly from one another toward their opposite ends. The arms 2 and 4 are each provided with an integral internal projection 8 extending toward each other and positioned close to the neck 6. An external shoulder 10 extends out from each of the arms 2 and 4 at an intermediate portion of their length and said shoulders are axially spaced from and face toward the neck 6. Two flanges 11 extend downwardly from the neck in diverging relationship from one another in the same direction as the legs but at a greater included angle than the angle between the legs and terminate at points adjacent to a plane passing through the shoulders 10. As shown in FIG. 4, the flanges 11 preferably have a large dimension in side view than the equivalent dimension of the legs, for purposes best set forth hereinafter.

Preferably, as shown, the ends of the arms 2 and 4 are formed with portions 12 and 14 which, when the arms are pinched together, interengage so as to restrain relative longitudinal sliding of the arms while permitting relative hinging. In the embodiment shown, the portion 12 consists of a pair of ribs extending inwardly from the extremity of leg 2 and the portion 14 consists of a single rib extending inwardly from leg 4 which is adapted to fit between the pair of ribs 12 when the legs are pinched together.

The clips are preferably injection molded in one piece from thermoplastic material such as those commercially sold under the trademarks "Alcon" or "Delrin."

While rods, pipes, or wires having a relatively small cross-sectional area, which need not be circular in cross section, are adapted to be mounted by such a clip, for brevity, reference will be made to rods throughout the remainder of the specification. To use such a clip, a rod 16 is assembled with the clip, as indicated by the arrow 18 in FIG. 1, by passing it between the portions 12 and 14 and upwardly between the legs 2 and 4 and thence forcing it between the projections 8 until it is seated against the neck 6 in the position shown in FIG. 2. At this stage, the rod is gripped frictionally but can be slid longitudinally relative to the clip.

The clip is then attached to a panel by inserting the legs 2 and 4 into aperture 20. In preparation for this the legs are pinched together by applying force to the ends of the flanges 11, as indicated by the arrow 22 in FIG. 1. This brings the portions 12 and 14 at the extremity of the legs into interengagement. In this condition, the two legs combine to present a tapered nose, as shown in FIG. 2. The clip is driven into the panel by applying a force to the neck 6, as indicated by the arrow 24 in FIG. 2 and the cooperation of the outside surfaces of the legs with the edge of the hole causes the legs to be cammed together into the position indicated in solid lines in FIG. 3, until the shoulders 10 reach the rear face 26 of the panel 28, whereupon the legs snap apart into the position shown in broken lines in FIG. 3 with the shoulders 10 engaging the rear face 26.

By the time this position has been reached, the flanges 11 have engaged the front face 30 of the panel and have been flexed into the position shown in FIG. 3. In consequence, the clip is in a state of stress in which the panel is clamped between the flanges 11, which serve as a resilient head member, and the shoulders 10, while the rod 16 is gripped more securely than it was initially.

The flanges 11, as seen in end view in FIG. 3 engage the panel over a broad base so that rocking in the direction $x$—$x$ is resisted. Moreover, as shown in FIG. 4, the flanges are of larger dimension in side view than are the legs and so also resist rocking the direction $y$—$y$ as well as serving as a head means larger in transverse dimension than the dimensions of the aperture 20. Furthermore, the flanges 11 present substantial frictional resistance to rotation of the clip about the axis of the aperture.

Thus, the embodiment described provides a means of firmly locating a rod of small size in spaced relationship to the surface of an apertured panel and additionally, the closed neck 6 passing over the rod assures that there is no possibility of the rod escaping in the direction away from the panel.

The clip may be used in either a rectangular hole or a round hole and the resilience of the various parts of the clip is such that it can accommodate appreciable variations in panel thickness and hole size.

Another feature of the embodiment described is that the hinging action of the portions 12 and 14 insures that the majority of the deflection of the legs towards one another occurs during the early part of introduction of the clip into the panel and the amount of additional deflection occurring just before the shoulders 10 reach the rear face of the panel is small. This counteracts the tendency of the edge of the panel to cut into the material of the clip and thus weaken the security of the engagement of the shoulders with the panel.

While other embodiments will be apparent to those skilled in the art, it is my intent that I be limited only by the appended claims. I claim:

1. A clip for mounting an elongated member adjacent to the face of an apertured panel including two arms joined at one end by a neck, means positioned internally of said arms adjacent said neck and adapted to accept said elongated member, flange means extending outwardly in the direction of said arms from the region of the juncture of said arms with said neck, shoulder means on each arm spaced from and facing said neck, means at the extremities of said arms opposite said neck adapted to permit said arms to abut when squeezed together and also to permit relative hinging between said arms at said extremities.

2. A device of the type claimed in claim 1 in which said means at the extremities of said arms are shaped to interengage on being moved towards one another in a manner to restrain relative longitudinal sliding of the arms while permitting said hinging.

3. A device of the type claimed in claim 1 in which said device is molded in one piece from thermoplastic materials.

4. A device of the type claimed in claim 1 in which the arms when in unstressed condition diverge from one another as they extend away from said neck and said flange means diverge similarly but at a greater included angle, said flange means terminating at a point falling in a plane passing through said shoulder means on said arms.

5. A device of the type claimed in claim 1 in which each arm tapers from the shoulder to its end remote from said neck to provide a cam surface for engaging the periphery of the aperture in the panel when the arms are inserted into the aperture.

6. A device of the type claimed in claim 1 in which said means positioned internally of said arm include an internal projection extending inwardly from each arm whereby the elongated member is substantially fully encircled by said projections and said neck when assembled to the panel.

7. A device of the type claimed in claim 2 wherein said means at the extremities of said arms include one arm having near its end remote from the neck two ribs spaced apart along the arm to define a groove between them and the other arm having a rib which can engage in the groove in the opposite arm to restrain said relative longitudinal sliding movement but permit said relative hinging.

8. A device of the type claimed in claim 1 in which the width of the flange means is greater than the width of the arms.

References Cited

UNITED STATES PATENTS 2,065,843   12/1936   Van Uum _____ 24—259 X

FOREIGN PATENTS 1,267,508   6/1961   France.

WILLIAM FELDMAN, Primary Examiner.

G. WEIDENFELD, Examiner.